Figure 1:
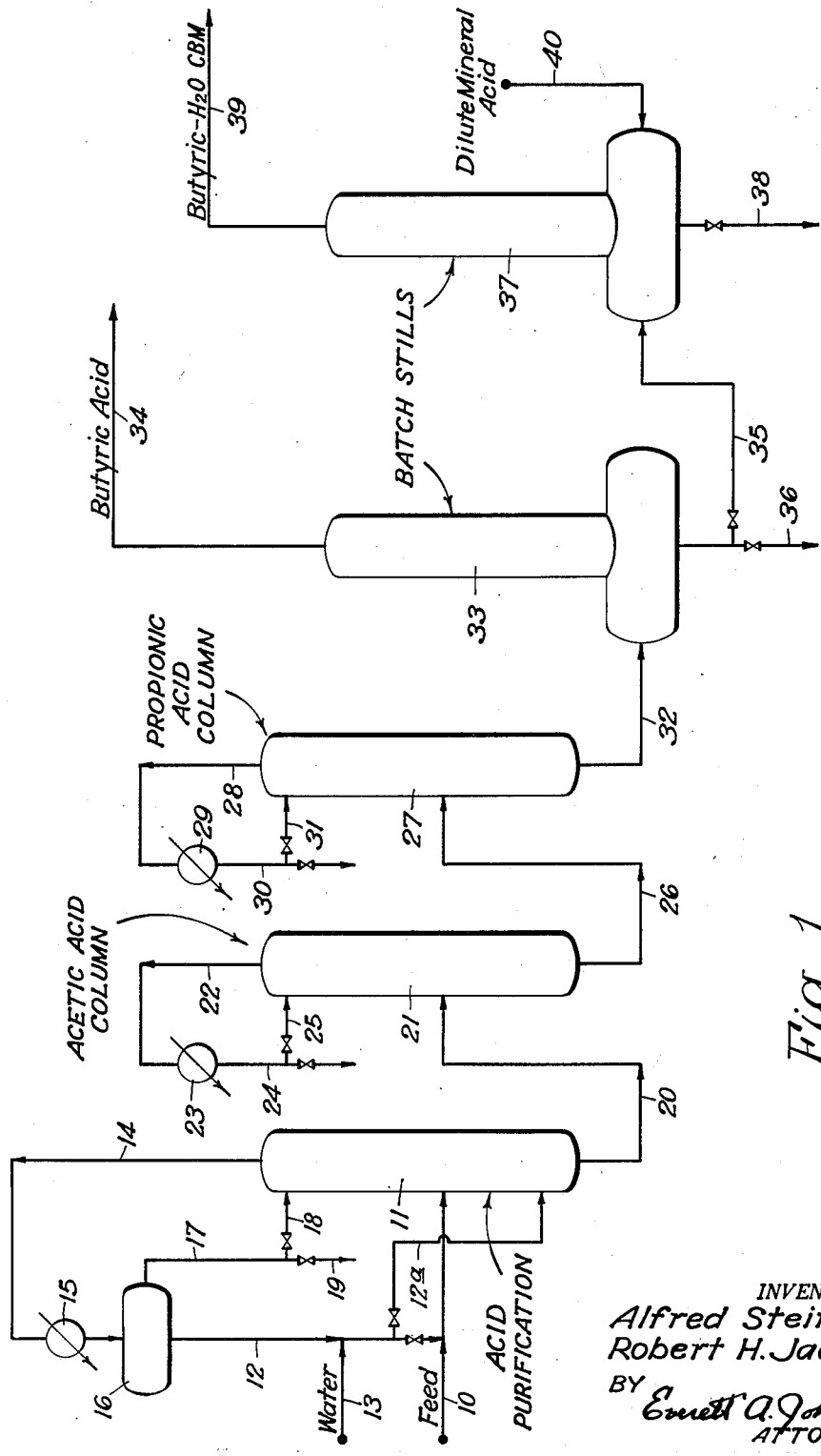

Patented Jan. 26, 1954

2,667,502

UNITED STATES PATENT OFFICE 2,667,502

PURIFYING SYNTHETIC WATER-SOLUBLE CARBOXYLIC ACIDS

Alfred Steitz, Jr., and Robert H. Jacoby, Tulsa, Okla., assignors to Stanolind Oil and Gas Company, Tulsa, Okla., a corporation of Delaware Application January 27, 1949, Serial No. 73,144

5 Claims. (Cl. 260—450)

This invention relates to processes of purifying aliphatic acids, and more particularly the processes for removing complex organic contaminants and the like from acetic, propionic, butyric and higher aliphatic acids or mixtures thereof.

In the production of organic oxygenated compounds by various processes, such as the hydrogenation of carbon oxides, the oxidation of normally liquid hydrocarbons, action of micro-organisms, and the like processes, products of considerable complexity are obtained which comprise a wide variety of organic oxygenated compounds including acids, alcohols, aldehydes and ketones of a broad range of molecular weight. For example, when carbon monoxide is hydrogenated in the presence of an alkali-promoted fluidized finely divided iron catalyst at temperatures of between about 580 and 625° F. and under pressures of above 250 pounds per square inch, an aqueous phase and a liquid hydrocarbon phase are produced, both being rich in oxygenated compounds. The aqueous phase includes among other organic oxygenated compounds a recoverable proportion of aliphatic acids such as acetic acid, propionic acid and butyric acids.

Simple, direct fractional distillation of either the hydrocarbon phase or the aqueous phase is not feasible because of the numerous multiple component azeotropes that are known to exist among the various constituents and because of a tendency of certain of the components to react, decompose or polymerize when such a mixture is exposed to elevated temperatures for suitable periods of time. In the recovery of oxygenated compounds from aqueous solutions it has been proposed to fractionally distill the solutions to separate the oxygenated compounds into two groups, the alcohols, aldehydes and ketones being taken overhead and the acids being removed in aqueous solution at the bottom of the still. The top temperature of the fractionator is maintained at such a level that the overhead comprising predominantly alcohols, aldehydes and ketones is substantially free from acids and accordingly some of the heavier alcohols, aldehydes and ketones remain with the carboxylic acid fraction. These residual alcohols, aldehydes and ketones are removed with the acid fraction by extraction with ethyl acetate and the extract of ethyl acetate and mixed acids is subsequently distilled for the recovery and recycle of ethyl acetate to the extractor. The mixed acids, accordingly, include some ethyl acetate and higher-boiling connate esters as the contaminant, as well as aldehydes and ketones produced in the synthesis. It is with respect to this contaminated, mixed acid stream that our invention has particular reference.

The separation and purification of a crude mixture of acetic, propionic and butyric acids containing small amounts of contaminants present a difficult problem. The contaminants which are present in the acid mixtures apparently have boiling points near the boiling points of the acids or form azeotropic mixtures on distillation with the acids and the separation of uncontaminated acids, such as acetic, propionic or butyric acids, is made difficult by the complex nature of the mixture in which they occur.. Thus, the acid stream to be purified may contain acetic, propionic and butyric acids and contaminants which may include esters, aldehydes and ketones corresponding to butyraldehyde and ethyl acetate and higher.

Heretofore the contaminants which occurred with the aliphatic acids have been removed with considerable difficulty and at prohibitive expense. It is, therefore, a primary object of our invention to separate substantially pure aliphatic acids from contaminated mixtures thereof. Other objects and advantages of our invention will become apparent from the following description taken with the drawings which form a part thereof.

We have discovered that the connate contaminants can be removed from the crude acids by distilling in the presence of a small amount of added water to remove the contaminats as the water azeotrope. The feed or acid stream supplied to the purification tower may, for example, be the water-free acid bottoms from the solvent-acid column in the extraction stream together with a sufficient amount of added water to azeotrope with all of the contaminants. If desired, a slight excess of water may be used to azeotrope a small proportion of the propionic and butyric acids thereby assuring complete removal of contaminants. The water and the acid bottoms stream are introduced into a purification tower. In the preferred embodiment, the streams are introduced separately at vertically spaced points in the tower with the water entering below the acid. The overhead fraction from the acid purification tower or zone can be cooled and separated into a water layer and a discard organic contaminant layer. The separated water may be returned to the purifying tower to azeotrope with additional contaminats, but means for adding make-up water should be provided.

It is desirable to have the slight excess of water so as to effect the substantially complete removal of the impurities as the water azeotropes of the contaminants. However, since the acetic acid must be free of water, the distillation may be continued so as to remove the residual excess water as constant boiling mixtures of propionic and butyric acid with water. The bottoms from the tower will then be pure acetic acid, propionic acid and butyric and valeric acids, except for very small amounts of very heavy impurities, such as iron, which cannot be removed as an azeotrope. These latter heavy impurities may be removed as bottoms in the distillation of the butyric acid fraction.

The advantage of our invention includes the fact that a stream of pure and dry acids can be produced in a single fractionating tower and the acetic acid and propionic acid may be removed from this pure, dry mixture in a subsequent tower leaving a butyric acid as bottoms. Alternately an initial split can be made between the propionic and butyric acids, the acetic and propionic acids being purified together and then separated.

Briefly, we may attain the objects of our invention by removing the impurities boiling below butyric acid (163.5° C.) as the water azeotrope in a first column. Although water does azeotrope with small amounts of propionic and butyric acids, these azeotropes boil at a temperature higher than those of the contaminant. Accordingly, it is possible to remove all the contaminants from the acids. The overhead from the acid purification column, which comprises the water azeotropes of the complex contaminants, is cooled and separated into an organic layer and a water layer. The water layer is recycled to the feed for azeotroping with additional quantities of the contaminants and the organic layer may be divided between reflux in the acid purification column and recovery as product. The bottoms from the first column is then introduced into a second column where acetic acid is taken overhead. The propionic and butyric acids recovered as bottoms from the second column are separated under reduced pressure in a third column where propionic acid is taken overhead. The n- and iso-butyric acids obtained from the third column as bottoms are batch distilled under vacuum. The butyric acid iron salts remaining after such an operation are mixed with water, acidified with dilute mineral acid and the butyric acid-water azeotrope distilled overhead in a final batch still and recycled as part of the feed in the acid extraction system. If desired, the last step of recovering the butyric acid from iron salts may be eliminated and the bottoms from the vacuum distillation discarded.

Referring to Figure 1 of the drawing, which is a diagrammatic illustration of one embodiment of our invention, a mixed acid stream containing acetic, propionic and butyric acids contaminated with esters, aldehydes and ketones is introduced by line 10 into tower 11 which may be provided with tower top cooling means and reboiler (not shown). The feed contains sufficient water to azeotrope with the contaminants plus a slight excess of water to azeotrope with small amounts of butyric and propionic acids. Water is combined with the acid stream via line 12 and comprises predominantly water which has been recycled as described hereinafter, but make-up water can be supplied by line 13. It is also contemplated that recycle or make-up water may be introduced directly and separately to the tower 11.

Within the tower 11, the water azeotropes of the contaminants are taken overhead via line 14 at a temperature of about 210° F., passed through cooler 15 and introduced into the separator 16. In the separator 16 a lower water layer and an upper contaminant or organic layer separate. The water may be recycled via lines 12 and 10, or lines 12 and 12a, to azeotrope with additional quantities of organic contaminants within acid purification tower 11. The organic layer separated in 16 is withdrawn via line 17 and ordinarily will be withdrawn as product by line 19, but if desired a portion thereof may be returned as reflux via line 18. The reboiler temperature in tower 11 should be at the boiling point of the acetic-propionic acid mixture under the reboiler pressure so that no water will appear in the bottoms.

The purified, mixed aliphatic acids are withdrawn as bottoms via line 20 from tower 11 and introduced into tower 21. The mixed dry acids in line 20 comprise acetic acid, propionic acid, butyric acid, and possibly valeric acid, together with a small amount of iron salts. From the tower 21, acetic acid is separated from the heavier acids and withdrawn overhead via line 22 at a temperature of about 245° F., and atmospheric pressure, passed through cooler 23 and withdrawn as concentrated acetic acid product via line 24 with a portion being returned to tower 21 as reflux via valved line 25. The reboiler temperature in tower 21 should be the boiling point of the acids heavier than acetic acid in order to insure that no acetic acid is removed from the bottom of the column with the other acids.

The bottoms from tower 21 are passed by line 26 into tower 27 wherein propionic acid is separated from butyric acid and heavier components under reduced pressure of between about 350 and about 485 mm. Hg, a tower top temperature of about 245° F., and a reboiler temperature of about 275° F. The propionic acid product is withdrawn overhead via line 28, passed through cooler 29 and recovered via line 30. A portion of the propionic acid product may, however, be returned as reflux to the tower 27 via valved line 31.

The bottoms from the propionic acid tower 27 comprise predominantly butyric and valeric acids and some iron acid salts. These bottoms are supplied by line 32 to a reduced pressure batch still 33. In this still 33, butyric acid is recovered as an overhead fraction by line 34 and the bottoms consist essentially of iron acid salts. These may be discarded via line 36 or treated in batch still 37 with a dilute mineral acid such as sulfuric acid introduced via line 40 whereby the iron acid salts are hydrolized to produce a dilute salt solution discarded via line 38 and a constant boiling mixture of butyric acid and water which may be withdrawn overhead from batch still 37 by line 39. This constant boiling mixture may be recycled to the original acid extraction step and ultimately returning to tower 11 as part of the acid feed introduced by line 10.

The embodiment of our invention illustrated in Figure 1 includes splitting the acid mixture into an acetic acid fraction and a mixed propionic, butyric and valeric fraction; it is contemplated that the split can be made between propionic and butyric acids with a subsequent fractionation of acetic and propionic. This latter embodiment is illustrated in Figure 2.

Figure 2:
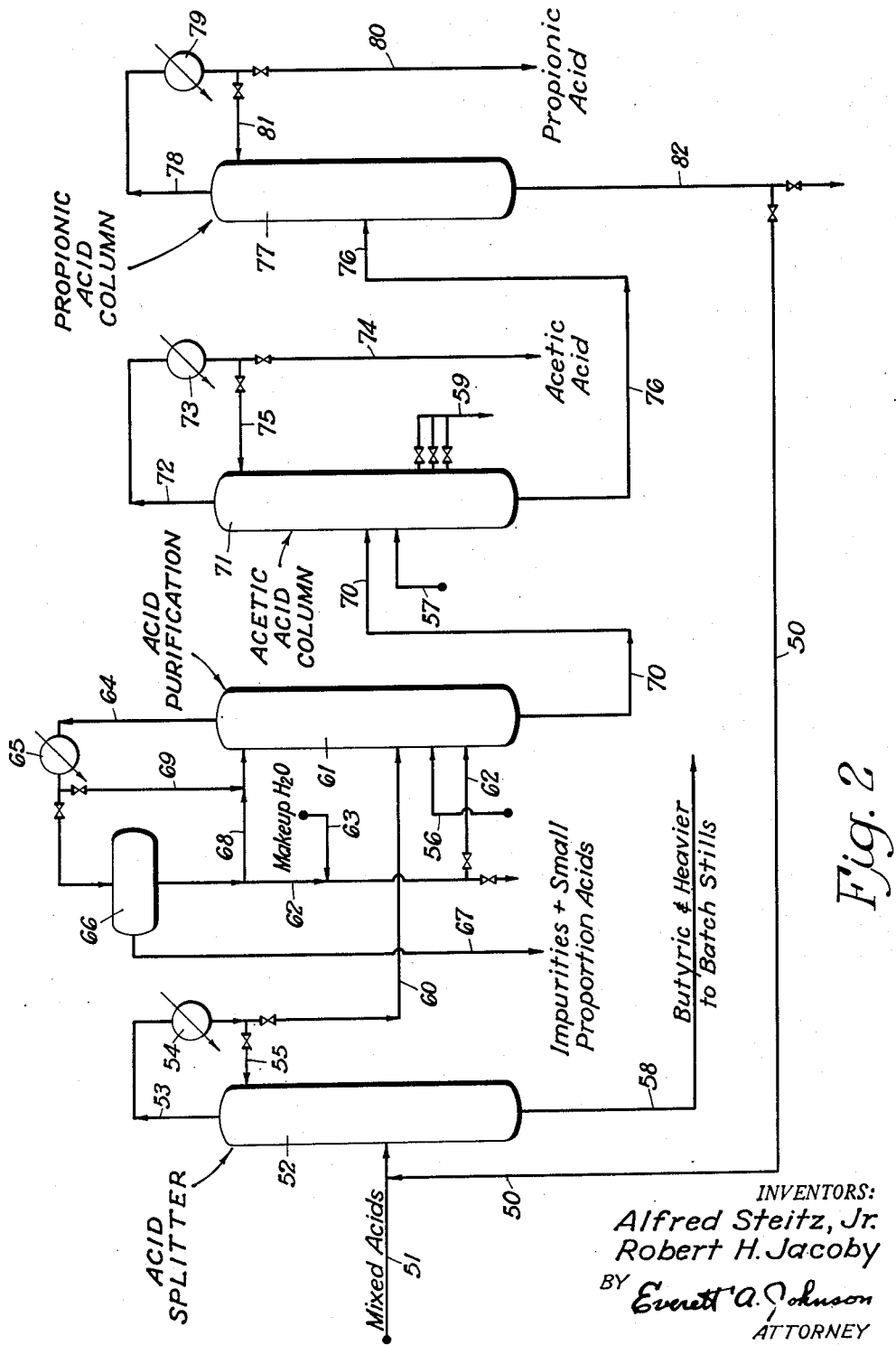

Referring to Figure 2, which is a diagrammatic illustration of another embodiment of our invention, a contaminated crude acid stream containing acetic, propionic and heavier acids, such as butyric and valeric acids, is introduced by line 51 into acid splitter or fractionator 52. Since there is likelihood of cracking the butyric and heavier acids in tower 52 if too high a temperature is maintained therein, the tower is operated at a pressure below atmospheric. The maximum reboiler pressure allowable is about 500 mm. Hg in order to keep the reboiler temperature at or below about 300° F. These conditions fix the upper limit of the tower operating pressure and the lower limit of tower operating pressure depends upon the temperature of cooling water available. A heavy acid bottoms fraction, including butyric and valeric acids, is withdrawn by line 58 for further processing which may, for example, be as described in connection with line 32 et seq. of Figure 1. An overhead fraction comprising the lower-boiling acetic and propionic acids and their contaminants is withdrawn from the acid splitter 52 at a temperature of about 210° F. and passed by line 53 through condenser 54. A portion of the condensate may be refluxed to tower 52 via line 55 and the balance is passed by line 60 into the acid purification tower 61.

Water is introduced into purification tower 61 via line 62 and comprises predominantly water which has been recycled from separator 66 as described hereinafter, but make-up water can be supplied by line 63 as needed. The amount of water introduced is enough to azeotrope with all the contaminants in the organic acid feed plus a slight excess. The use of excess water results in more complete purification of the acids, but also azeotropes with and carries acid overhead. Accordingly, the balance is between the extent of purification required and the proportion of acid lost which is allowable. For example, a ratio of between about 8 or 9 pounds of crude acids per pound of water feed gives satisfactory purification.

Within the tower 61, the water azeotropes of the contaminants are taken overhead via line 64, and the tower is operated to produce an overhead vapor which can be condensed into two liquid phases. This overhead stream is passed through cooler 65 and introduced into separator 66. In the separator 66, a lower water layer and an upper contaminant or organic layer are separated. As much of the water or lower layer as necessary is returned to column 61 via line 62 to azeotrope with additional quantities of organic contaminants entering column 61 with the crude acids in line 60. If desired, a portion of the entire condensate from cooler 65 may be returned as reflux to tower 61 via line 69. Ordinarily, however, a portion of the water condensate from line 62 will be supplied as reflux via line 68 to the tower 61. A small reflux ratio of between about 1 and 6 to 1 is preferred, the balance of the water being withdrawn from the system. If desired, an oxidizing agent, such as potassium permanganate, peracetic acid, or sodium hypochlorite, may be introduced into the acid purifier 61 as an aqueous solution via line 56 or an oxidizing agent may be introduced into the acetic acid column 71 via line 57 as a dry powder.

The purified, mixed aliphatic acids comprising acetic acid, propionic acid, and a small proportion of heavier acids together with some iron salts are withdrawn as bottoms via line 70 from tower 61 and introduced into tower 71. This tower fractionates acetic acid from propionic acid. The top temperature may be maintained at about 245 F., the reboiler about 300 F., and the outlet pressure at about atmospheric. Acetic acid is separated from the heavier acid fraction within the tower 71 and withdrawn overhead via line 72, passed through cooler 73, and recovered as the acetic acid product via line 74. A portion of the product may be returned to tower 71 as reflux via valved line 75.

The bottoms from the acetic acid column 71 are introduced by line 76 into tower 77 wherein propionic acid is separated from butyric acid and heavier components under subatmospheric pressure. The propionic acid product stream is withdrawn overhead via line 78 at a temperature of about 245° F. and passed through condenser 79 for recovery via line 80. A portion of the liquid propionic acid product may, however, be returned as reflux to the tower 77 via valved line 81. The small stream of bottoms from the propionic acid column 77 comprises predominantly butyric and some propionic acids. These acid bottoms may be withdrawn by line 82, or recycled via lines 50 and 51 to the acid splitter 52 for recovery of butyric and heavier acids for further processing as described in connection with the heavier acids withdrawn via line 58. Alternatively, such processing may comprise, for example, extraction with water to separate organic water-insoluble contaminants therefrom, distillation with a hydrocarbon to dry the mixed acids, and fractionation under vacuum in the presence of an oxidizing agent to eliminate residual impurities.

The purposes of the purification of the mixed aliphatic acids are to decrease the turbidity upon subsequent dilution of the acid, to increase the permanganate time, and to increase the purity of the particular acid fractions. The permanganate time test consists of adding 0.1 ml. of 0.1 N potassium permanganate to 2 ml. of the acid under test dissolved in 10 ml. of water. The pink color should not disappear within two hours.

The main object of the removal of the organic contaminants which are separated as the water azeotrope is to meet the turbidity test. However, the mere removal of esters does not assure a good permanganate test and the real cause of the differences in permanganate time is not clear.

To demonstrate the effectiveness of this invention in purifying crude acetic and propionic acid mixture produced by synthesis from hydrogen and carbon monoxide, a quantity of the mixture was distilled in the presence of 10% by volume of an aqueous solution containing 0.54% potassium permanganate. After removal of the water azeotropes by fractionation, dry acids were obtained having the following specifications:

|  | B. P. Range, °C. | Purity, Percent | Turbidity | KMnO₄ Time (Hrs.) |
|---|---|---|---|---|
| Acetic Acid Cut | 117.0–118.0 | 99.70 | None | Over 17. |
| Propionic Acid | 73–74 at 60 mm | 99.78 | ...do | Over 5. |

Although we have described our invention with reference to preferred embodiments thereof, it will be apparent that modifications may be made in the details of our process without departing from the spirit thereof. For clarity, apparatus details such as pumps, reboilers, valves, and the like have been omitted from the drawing, but it is to be understood that the apparatus, techniques and procedures available to those skilled in the art may be used in adapting and applying our invention. It will be apparent, moreover, that while we prefer to effect the various operations of our process in a continuous manner, we may also operate batchwise or semi-continuously. In general, it is intended that any modifications or equivalents of our process which might occur to one skilled in the art come within the scope of our invention. Furthermore, although the foregoing flow sheets and descriptions thereof illustrate advantageous embodiments of our invention, this is for the purpose of illustration only and we do not intend to be limited to the particular embodiments described.

What we claim is:

1. In a process for obtaining substantially pure dry acetic acid and water-soluble carboxylic acid, which form minimum boiling azeotropes with water, from dilute aqueous solutions thereof, said acids having been produced by synthesis from hydrogen and carbon monoxide and containing water-soluble organic oxygenated impurities simultaneously produced with said acids, including water-soluble esters and carbonyl compounds which boil near the boiling points of said acids or form azeotropes with at least some of said acids in the absence of water, wherein a dilute aqueous mixture of said acids and impurities is first subjected to extraction with a substantially water-immiscible solvent for said acids, and the latter, together with said impurities, separated in substantially anhydrous form from the resulting extract to obtain said acids in a substantially anhydrous fraction containing said impurities, the steps which comprise adding only sufficient water to said fraction to form minimum boiling azeotropes with said impurities, and thereafter subjecting the resulting mixture to distillation at a temperature below the boiling point of said first-mentioned minimum boiling azeotropes until said fraction is sufficiently free of said impurities to pass standard acid turbidity tests.

2. The process of claim 1 in which the acids present in said aqueous solution include propionic and butyric acids.

3. The process of claim 1 in which the substantially water-immiscible solvent for said acids is ethyl acetate.

4. In a process for obtaining substantially pure dry water-soluble carboxylic acids, which form minimum boiling azeotropes with water, from dilute aqueous solutions thereof, said acids having been produced by synthesis from hydrogen and carbon monoxide and containing water-soluble organic oxygenated impurities simultaneously produced with said acids, including water-soluble esters and carbonyl compounds which boil near the boiling points of said acids or form azeotropes with at least some of said acids in the absence of water, wherein a dilute aqueous mixture of said acids and impurities is first subjected to extraction with a substantially water-immiscible solvent for said acids, and the latter, together with said impurities, separated in substantially anhydrous form from the resulting extract to obtain said acids in a substantially anhydrous fraction containing said impurities, the steps which comprise adding only sufficient water to said fraction to form minimum boiling azeotropes with said impurities, and thereafter subjecting the resulting mixture to distillation at a temperature below the boiling point of said first-mentioned minimum boiling azeotropes until said fraction is sufficiently free of said impurities to pass standard acid turbidity tests.

5. The process of claim 4 in which the acids present in said aqueous solution include propionic and butyric acids.

ALFRED STEITZ, Jr.
ROBERT H. JACOBY.

References Cited in the file of this patent

UNITED STATES PATENTS

| Number | Name | Date |
|---|---|---|
| 2,013,096 | Haag | Sept. 3, 1935 |
| 2,159,984 | Fisher | May 30, 1939 |
| 2,227,485 | Bump | Jan. 7, 1941 |
| 2,438,300 | Schneipp | Mar. 23, 1948 |
| 2,476,788 | White | July 19, 1949 |
| 2,533,675 | Marschner | Dec. 12, 1950 |

OTHER REFERENCES

"Rogers Manual of Industrial Chemistry," Sixth Edition, published by D. Van Nostrand Company, Inc., 250 Fourth Ave., New York 1942. Vol 1, pages 674–677.